United States Patent [19]

Bang

[11] Patent Number: 6,076,409
[45] Date of Patent: Jun. 20, 2000

[54] MEDIA COMPATIBLE PACKAGES FOR PRESSURE SENSING DEVICES

[75] Inventor: Christopher Bang, Royalton, Ohio

[73] Assignee: Rosemount Aerospace, Inc., Burnsville, Minn.

[21] Appl. No.: 08/995,829

[22] Filed: Dec. 22, 1997

[51] Int. Cl.[7] ...................................................... G01L 7/00
[52] U.S. Cl. ............................................................ 73/756
[58] Field of Search ............................. 73/715, 716, 717, 73/718, 719, 720, 721, 723, 724, 725, 726, 727, 756

[56] References Cited

U.S. PATENT DOCUMENTS

| 4,023,562 | 5/1977 | Hynecek et al. . |
| 4,222,277 | 9/1980 | Kurtz et al. . |
| 4,287,501 | 9/1981 | Tominaga et al. . |
| 4,563,903 | 1/1986 | Köhnlechner et al. . |

(List continued on next page.)

FOREIGN PATENT DOCUMENTS

| 677 726 A2 | of 0000 | European Pat. Off. . |
| 0570624 | 11/1992 | European Pat. Off. . |
| 0710826 | 10/1995 | European Pat. Off. . |
| 0800070 | 4/1997 | European Pat. Off. . |
| 37 03 685 C2 | of 0000 | Germany . |

OTHER PUBLICATIONS

Notification of Transmittal of the International Search Report or the Declaraction in PCT International Application US98/27388. (No date).

Marek T. Wlodarczyk, *Environmentally insensitive commercial pressure sensor*, SPIE vol. 1368 Checmical, Biochemical, and Environmental fiber Sensors II (1990), pp. 121–123.

David J. Monk, Theresa Maudie, Dennis Stanerson, John Wertz, Gordon Bitko, Jeanene Matkin, and Slobodan Petrovic, *Media Compatible Packaging and Environmental Testing of Barrier Coating Encapsulated Silicon Pressure Sensors*, Solid–State Sensor and Actuator Workshop, Hilton Head, S. Carolina (Jun. 2–6, 1996) pp. 36–41.

Karsten Dyrbye, Tina Romedahl Brown and Gert Friis Eriksen, *Packaging of physical sensors for aggresive media applications*, J. Micromech. Microeng 6 (1996) pp. 187–192.

*Primary Examiner*—William Oen
*Attorney, Agent, or Firm*—Thompson Hine & Flory LLP

[57] ABSTRACT

Media compatible packages for pressure sensing devices include molded polymeric housings and diaphragms which mount and isolate pressure sensing devices in operative contact with any type of corrosive or non-corrosive media for pressure measurement. The various pressure sensor package housings include a main cavity in which a pressure sensor is mounted, a polymeric diaphragm bonded to the housing within the main cavity, at least one media port which leads to a pressure port on one side of the diaphragm, and a pressure transfer cavity on an opposite side of the diaphragm in which a pressure sensor is located. A fill port through a wall of the housing between the diaphragm and the pressure sensor allows the pressure transfer cavity to be filled with a pressure transfer medium such as oil and then sealed, without introducing any excess pressure. The use of bondable polymers to form the housing and thin film diaphragms provides excellent media compatibility for pressure measurements in corrosive environments. Differential dual port packages having a media conduit and diaphragm on opposite sides of a single sensor are also provided. Internal walls of the connectable halves of the pressure sensor housing are configured to capture, position and hold a pressure sensing device within a main cavity of the housing, and to form at least one pressure transfer cavity between a pressure sensing device and a diaphragm.

51 Claims, 2 Drawing Sheets

U.S. PATENT DOCUMENTS

| | | |
|---|---|---|
| 4,576,049 | 3/1986 | Köhnlechner . |
| 4,644,797 | 2/1987 | Ichikawa et al. . |
| 4,656,454 | 4/1987 | Rosenberger et al. . |
| 4,658,651 | 4/1987 | Le ................ 73/708 |
| 4,675,643 | 6/1987 | Tanner et al. . |
| 4,686,764 | 8/1987 | Adams et al. . |
| 4,691,573 | 9/1987 | Varnum et al. . |
| 4,695,817 | 9/1987 | Kurtz et al. ................ 338/4 |
| 4,732,042 | 3/1988 | Adams . |
| 4,763,098 | 8/1988 | Glenn et al. . |
| 4,773,269 | 9/1988 | Knecht et al. . |
| 4,784,721 | 11/1988 | Holmen et al. . |
| 4,790,192 | 12/1988 | Knecht et al. . |
| 4,841,777 | 6/1989 | Hershey et al. . |
| 4,888,662 | 12/1989 | Bishop ................ 73/724 |
| 4,920,972 | 5/1990 | Frank et al. . |
| 4,926,155 | 5/1990 | Colla et al. . |
| 4,934,193 | 6/1990 | Hayata . |
| 4,993,265 | 2/1991 | Koen et al. . |
| 5,076,147 | 12/1991 | Hegner et al. . |
| 5,184,107 | 2/1993 | Maurer . |
| 5,212,989 | 5/1993 | Kodama et al. . |
| 5,222,397 | 6/1993 | Kodama ................ 73/756 |
| 5,279,164 | 1/1994 | Araki et al. . |
| 5,307,684 | 5/1994 | Moss et al. . |
| 5,333,507 | 8/1994 | Vogler et al. ................ 73/756 |
| 5,351,550 | 10/1994 | Maurer ................ 73/727 |
| 5,436,491 | 7/1995 | Hase et al. . |
| 5,438,876 | 8/1995 | Lewis . |
| 5,461,922 | 10/1995 | Koen . |
| 5,483,834 | 1/1996 | Frick . |
| 5,518,951 | 5/1996 | Paynter et al. . |
| 5,518,957 | 5/1996 | Kim . |
| 5,522,267 | 6/1996 | Lewis . |
| 5,581,226 | 12/1996 | Shah . |
| 5,595,939 | 1/1997 | Otake et al. ................ 437/209 |
| 5,600,071 | 2/1997 | Sooriakumar et al. . |
| 5,796,007 | 8/1998 | Panagotopulos et al. ................ 73/716 |

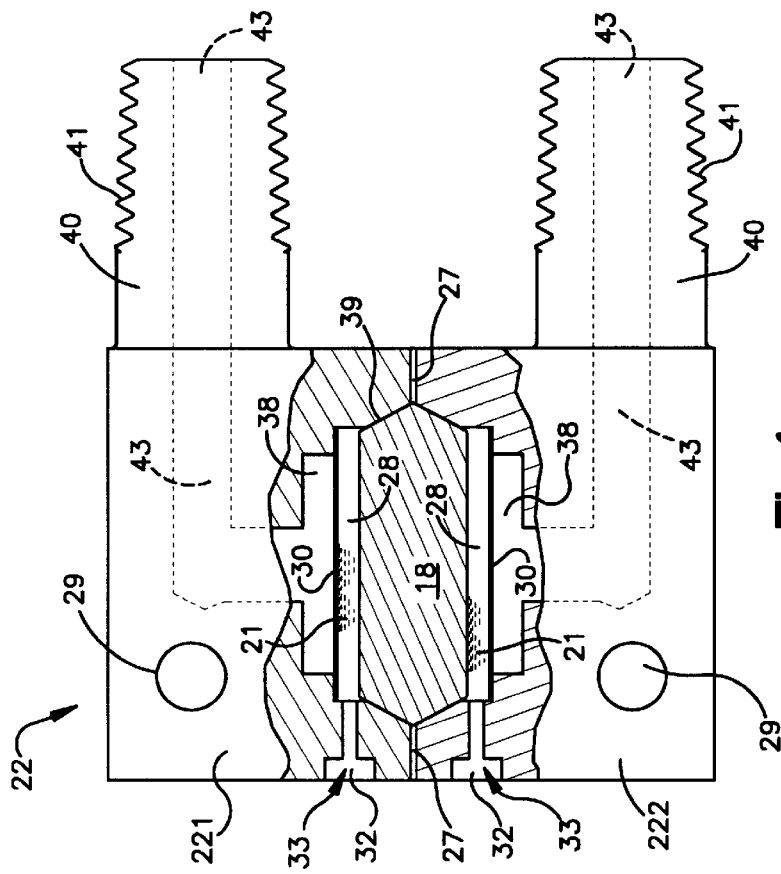
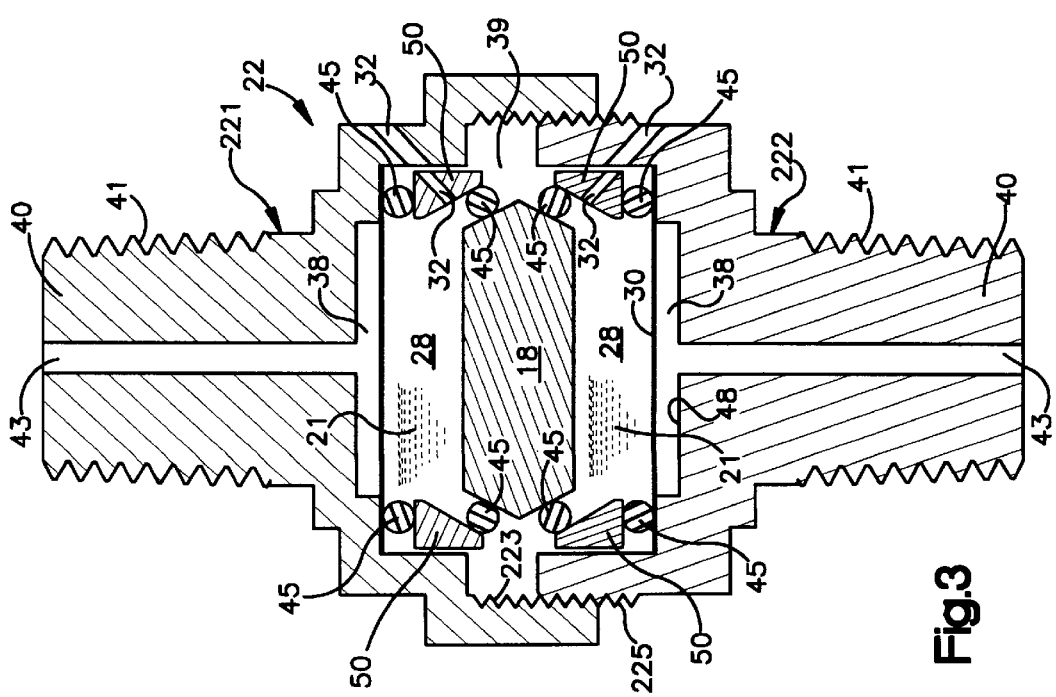
Fig.4
Fig.3

MEDIA COMPATIBLE PACKAGES FOR PRESSURE SENSING DEVICES

FIELD OF THE INVENTION

The present invention pertains generally to pressure sensing devices and, more particularly, to housings for relatively small-scale pressure sensing devices which are designed to be placed in close proximity to various substances from which pressure is measured.

BACKGROUND OF THE INVENTION

Pressure transducers are used in a wide range of applications. In many cases, it is desirable to measure the pressure of fluid media which may be harmful or corrosive to the transducer material, such as water, fuel, oil, acids, bases, solvents, other chemicals, and corrosive gases. There are numerous high-volume applications where a media compatible pressure transducer is highly desired but not available in any currently available technology with satisfactory durability, performance, or price characteristics. There is a need for media compatible pressure sensor packages which have substantial performance and cost advantages over existing technologies and provide new capabilities not previously realized.

Pressure is one of the most commonly measured physical variables. While pressure measuring instruments have been available for many decades, the proliferation of inexpensive solid-state silicon pressure transducers has resulted in tremendous growth in the number and different types of applications of pressure transducers. The most common pressure transducers are solid-state silicon pressure transducers employing a thin silicon diaphragm which is stressed in response to an applied pressure. The stress is measured by piezoresistive elements formed in the diaphragm. Pressure transducers are also formed similarly using metal foil diaphragms and thin film stress sensing elements. In some cases, one or two pressure sensing diaphragms are part of a parallel plate capacitor, in which the applied pressure is detected by the change in capacitance associated with the deflection of the loaded plate or plates. Other pressure measurement techniques include spring-loaded members which move in response to an applied pressure. For vacuum pressures there are a wide variety of other pressure measurement techniques.

Pressure transducers are used to measure pressures in a wide variety of fluid media, including but not limited to: air, nitrogen, industrial process gases, water, automotive fluids, pneumatic fluids, coolants, and industrial chemicals. In many important applications, the media which the pressure transducer must measure is corrosive or damaging to the transducer itself. In these cases, the pressure transducer must either be constructed in such a way that it is resistant to the media of interest, or the transducer must somehow measure the pressure while being physically isolated from the media of interest. To date, pressure sensors are either inadequately protected for media compatibility or are prohibitively expensive for many applications.

Many different types of pressure sensors have been devised. The overwhelming majority of pressure transducers for media compatibility are protected by a stainless steel housing, with a single stainless steel diaphragm providing a barrier between the pressure sensing element and the media. The empty volume between the steel diaphragm and the pressure sensing element is filled with a fluid, such as silicone oil. When the steel diaphragm deflects due to an externally applied pressure, the essentially incompressible fluid transmits that pressure to the internal pressure sensing element, which produces a voltage or current signal proportional to the pressure. While these stainless steel packaged pressure transducers are widely used, they have several shortcomings, including relative complexity and high cost. While in some industrial applications the rugged steel housing may be preferred regardless of price, there are numerous high-volume applications for media compatible pressure sensors in which the cost of the steel packages are prohibitively expensive. Also, the steel diaphragms, while thin, are inherently stiff due to the high modulus of steel. This results in a loss of sensitivity to applied pressure which is undesirable for transducer performance, especially at lower applied pressures. These types of sensors are also inherently sensitive to temperature. A temperature rise causes the internal fluid to expand. Constrained by the steel diaphragm, the pressure of the fluid rises, producing a false pressure reading. This temperature sensitivity is typically corrected with external passive or active electronic components which add to the cost of the transducer. Fourth, the stainless steel material is not satisfactory for many media applications. Stainless steel will eventually corrode in certain environments with harsh acids and bases present. In some applications, such as in the semiconductor industry and biomedical applications, even if the steel is resistant to the chemical substance in question, minute trace amounts of steel or corrosion products released into the media cannot be tolerated. Also, steel housings add substantially to the weight and size of the transducers.

Solid-state silicon pressure sensors which are not specially packaged for media compatibility are only used with air or other inert gases. Because of the shortcomings of the steel packaged sensors and the conventional silicon sensors, other kinds of packages have been devised. One approach has been to limit media exposure to the more rugged portions of the silicon sensor, allowing the media to contact the silicon diaphragm while isolating the corrosion-sensitive metal portions of the sensor. This has been most readily accomplished by allowing media to contact the backside of the silicon diaphragm only. Because differential pressure is often needed, many of these methods involve arranging two pressure sensors together so that the backsides of both are used to measure a differential pressure. U.S. Patents relating to this approach include U.S. Pat. Nos. 4,695,817; 4,763,098; 4,773,269; 4,222,277; 4,287,501; 4,023,562; and 4,790,192. These approaches provide some media compatibility improvements, but are of limited usefulness since silicon corrodes in some acid or base environments. These approaches may add substantially to the sensor cost (especially if two sensors are used for one measurement application), or may be impractical to manufacture and assemble due to the unusual component orientation, assembly, bonding, sealing, and electrical interconnection requirements. The complex assembly of some of these devices is apparent from even a casual examination of the patent drawings. Another approach to exposing the silicon diaphragm only while protecting the metal regions is described in U.S. Pat. Nos. 4,656,454 and 5,184,107. These devices employ an elastomeric seal which contacts the diaphragm and separates the diaphragm and metal interconnect regions. Again, this device provides some improvement over conventional silicon pressure sensors but the elastomeric material also has significant limitations in the chemical environments it can withstand.

Silicon pressure sensors have also been coated with a protective material, such as silicone gel, to protect the device. This approach is very limited in the types of media in which it is effective, and the coating can also affect the sensor performance. A rubber membrane diaphragm has been used instead of steel for media isolation with a fill fluid. The media compatibility of a rubber device is an improvement over bare silicon but is still limited. Molded diaphragms are disadvantageous from a manufacturing standpoint for the reason that it is difficult to obtain uniform thickness in mass production.

SUMMARY OF THE INVENTION

The present invention overcomes these and other disadvantages of the prior art by providing a pressure transducer package which provides absolute protection of a pressure transducer from media which contacts a diaphragm located at a terminal end of a pressure port in a sensor package. In accordance with one aspect of the invention, a pressure transducer package includes a polymeric housing with a polymeric diaphragm which isolates media from a pressure transducer within the housing, and a fill fluid cavity through which pressure is transmitted to a pressure sensor mounted within the fill fluid cavity. In a preferred embodiment, the housing is made from plastic.

In accordance with another aspect of the invention, a media compatible pressure sensing device package includes a housing with a main cavity which encapsulates a pressure sensing device such as a solid state silicon-based pressure transducer with electrical output. A diaphragm is separately bonded to the main cavity of the housing to extend across an internal opening of the cavity over the pressure sensing device. The housing further includes a media conduit which leads to pressure port adjacent to a side of the diaphragm opposite to the pressure sensing device. The media conduit has a cross-sectional area which is less than a cross-sectional area of the pressure port. A fluid, preferably mineral oil, fills the pressure transfer cavity between the diaphragm and the pressure sensor, to transmit pressure applied to the diaphragm to the pressure sensor. The diaphragm is preferably a thin film polymer with excellent chemical resistive properties, such as Teflon® or polyethersulfone. A pressure transferring fluid such as mineral oil is introduced to the pressure transfer cavity through a fill port in a side wall of the housing. After the fill fluid is introduced, the fill port is plugged.

The sensor packages of the invention have several advantages over existing technologies, including exceptional media compatibility, particularly when constructed of polymeric materials. If the diaphragm and housing are made from Teflon, then the package will be impervious to nearly all industrial chemicals and gases. This represents a substantial improvement over even the steel diaphragm isolated pressure transducers in regard to media compatibility. The packages are compact and include few parts. The injection molded housing and stamped diaphragms can be produced and assembled very inexpensively. As a result, packaged sensors constructed in accordance with the invention can be mass produced at much lower cost than other packaged sensors. The use of a polymeric diaphragm instead of steel improves pressures sensitivity due to the increased flexibility of the polymer. Finally, inherent temperature sensitivity is reduced, since the flexible polymer diaphragm can relieve thermally generated expansion inside the fill fluid. This particular design is primarily intended for gage or absolute pressure measurement, depending on the pressure sensor chosen for the package. Note that the shape of the package may be modified to accommodate different pressure sensor designs. This design isolates the media, which would be applied through a tube fixed to the pressure port, from other parts of the package, such as the adhesive seals and electrical connectors, which would have less media resistance.

In accordance with another aspect of the invention, a media-compatible pressure sensor package includes a threaded package housing assembly which seals a pressure sensing device in a cavity of the housing. The use of adhesives is eliminated and the package can be easily manually assembled without special tools. A polymer diaphragm is positioned within the sensor housing and spaced from the pressure sensing device by an O-ring. The space between the diaphragm and the pressure sensing device provides a pressure transferring cavity which is filled with a pressure transferring medium such as mineral oil. The parts of the housing are thread-engaged, sealing the diaphragm in position within the housing to face a pressure port on one side, and the pressure sensing device on an opposite side.

In accordance with another aspect of the invention, a media compatible pressure sensor package for holding and isolating a pressure sensing device in operable contact with a media for sensing pressure of a media includes a housing adapted for attachment to a base on which a pressure sensing device is mounted, the housing having a main cavity and a media port which extends from the main cavity; a diaphragm attached to an interior of the housing in the main cavity; a pressure port in the main cavity between the diaphragm and the media port, and a fill port in the housing which extends from an exterior of the housing to main cavity on a side of the diaphragm opposite the pressure port.

In accordance with another aspect of the invention, a pressure sensing device package for holding a pressure sensing device in operative contact with a medium from which pressure is to be measured while isolating the pressure sensing device from direct physical contact with the medium includes a first and second housing pieces mechanically combined to form a main cavity adapted to accept and hold a pressure sensing device, the first housing piece having a media port adapted for connection to a medium vessel from which pressure is to be measured, a diaphragm in the main cavity of the housing, a pressure port between the media conduit and the diaphragm, and a pressure transfer cavity on a side of the diaphragm opposite to the pressure port.

In accordance with another aspect of the invention, a differential pressure sensing device package for housing and isolating a pressure sensing device in operative association with a media from which pressure is to be measured includes a housing having first and second pieces which are connectable together to form a main cavity within the housing adapted to receive a pressure sensing device, the first and second housing pieces each having a media conduit which extends from a pressure port and an internal structure adapted to receive and position a diaphragm, and means within the main cavity for positioning a pressure sensing device between a diaphragm in the first housing piece and a diaphragm in the second housing piece, and a pressure transfer cavity between each diaphragm and a pressure sensing device in the main cavity.

And in accordance with another aspect of the invention, a media compatible pressure sensing device package has a housing adapted to encapsulate a pressure sensing device to isolate the device from direct contact with a media from which pressure is to be measured while holding the device in operative contact with media to be measured, the housing has a main cavity adapted receive and hold a pressure sensing device, first and second media conduits connected to the main cavity, pressure ports in the main cavity located generally at the media conduits, and a diaphragm between each pressure port and the main cavity, whereby media which enters the housing through the media conduits is prevented from entering the main cavity by the diaphragms.

And in accordance with another aspect of the invention, a packaged pressure sensing device adapted for operative association with a media from which pressure is to be sensed or measured includes a housing having a media conduit which leads to a pressure port connected to a main cavity, a pressure sensing device mounted in the main cavity, a diaphragm permanently bonded to the interior of the main cavity adjacent to the pressure port and spaced from the pressure sensing device to form a pressure transfer cavity between the diaphragm and the pressure sensing device, a fill port which extends through a wall of the housing through which a pressure transferring medium is introduced into the pressure transfer cavity, and a fill port stopper which seals the pressure transfer cavity.

These and other aspects of the present invention are herein described in particularized detail with reference to the accompanying Figures wherein like references numerals refer to like or equivalent parts or features of the various embodiments.

BRIEF DESCRIPTION OF THE FIGURES

In the accompanying Figures:

FIG. 3 is a cross-sectional view of an alternate embodiment of a packaged pressure sensor constructed in accordance with the present invention, and FIG. 4 is a cross-sectional view of an alternate embodiment of a packaged pressure sensor constructed in accordance with the present invention.

DETAILED DESCRIPTION OF PREFERRED AND ALTERNATE EMBODIMENTS

Figure 1:
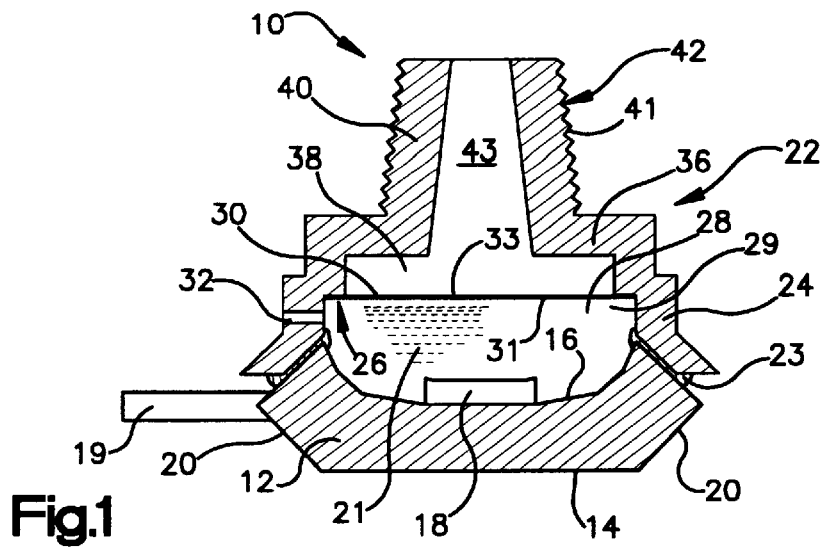
FIG. 1 is a cross-sectional view of a packaged pressure sensor constructed in accordance with the present invention.

With reference to FIG. 1, a packaged pressure sensor assembly, indicated generally at 10, includes a base 12 which has an external side 14 and an internal side 16 on which a pressure sensing device 18 (also referred to as a "pressure sensor", "pressure sensor die" or "transducer") is mounted. The pressure sensor 18 (which is typically in an encapsulation and may be pre-mounted to a base) may be any commercially available pressure sensor, such as solid state silicon type sensors such as the Motorola MPX5050 sensor. Electrical leads 19 extend from the pressure sensor 18 through the base 12. In this embodiment, the internal side 16 of the base 12 extends upwardly around its perimeter, and outer side walls 20 are angled. A housing, indicated generally at 22, has an outer flange 24 configured for overlying attachment to the outer side walls 20 of the base 12. In this embodiment, the flange 24 is attached to the outer side walls 20 by an adhesive 23. Other types of bonding or fixed attachment may be suitably employed. An interior surface 26 of the housing 22 is generally opposed to the internal side 16 of the base 12, thereby forming a main cavity 29 in which a diaphragm and pressure sensing device are located as described below.

Attached to or integrally formed with the housing 22 is a diaphragm 30 which extends from the interior surface 26 across an interior expanse of the housing 22. With the housing 22 attached to the base 12, the diaphragm 30 is oriented generally parallel to the central area of the internal side 16 of the base, with a lower side 31 of the diaphragm 30 overlying and spaced from the pressure sensor 18, and forming a pressure transfer cavity 28, within the main cavity 29, between the diaphragm and the internal side 16 of the base. The diaphragm 30 constitutes a substantial amount of the area of the interior surface 26 of the housing overlying pressure transfer cavity 28. A fill port 32 through the wall of the housing provides access to the pressure transfer cavity 28 to fill it with a pressure-transferring medium, indicated generally at 21, such as mineral or silicone oil which transfers pressure exerted on an upper side 33 of the diaphragm to the pressure sensor 18 when the housing is attached to a fluid carrying vessel or pipeline. Once the pressure transfer cavity 28 is filled, the fill port 32 is occluded by a stopper or any suitable sealant material. The fill port allows a pressure transfer fluid to be introduced to the pressure transfer cavity 28 without pressurizing the pressure transfer cavity 28, a condition which would distort the pressure readings of the sensing die. Without the fill port 32, a pressure transfer fluid would have to be poured into the pressure transfer cavity 28 prior to attachment of the housing 22. An excessive amount of pressure transfer fluid would put a load on the diaphragm 30 which would then have to be calibrated out of the pressure sensor readings. The fill port 32 is thus critical to the assembly of a media compatible pressure sensor package with excellent pressure reading accuracy. The diaphragm 30 can be attached to the interior surface 26 of the housing 22 by adhesive, thermal welding, or ultrasonic welding.

The housing 22 further includes an upper wall 36 which generally overlies diaphragm 30 to form a pressure port 38 which extends over a substantial area of an upper side 33 of diaphragm 30. A media conduit 40 extends from wall 36 and provides a flow path in the form of a bore 43 leading to the pressure port 38. An outer surface 42 of the media conduit may be provided with threads 41 or other fastening means such as barbs or a nipple for securement of the sensor package to any structure or other housing.

The housing 22 and diaphragm 30 are preferably made of any suitable injection moldable polymer such as Teflon® or polysulfone, to render the sensor package essentially impervious to water, detergent, oil and many industrial chemicals and gases. The polymer selected for the diaphragm 30 should have sufficient flexibility in the molded thickness to provide the desired pressure sensitivity. Preferred materials for the diaphragm 30 are Teflon® or polyethersulfone. Of course the thickness dimension and the resultant flexibility/sensitivity properties of the diaphragm can be selectively set in the process of molding such materials in sheet form from which multiples diaphragms are cut. The ensures that the diaphragms are of close tolerance thickness in mass production, which is a parameter critical to the accuracy of sensor readings contained in the packages.

Figure 2:
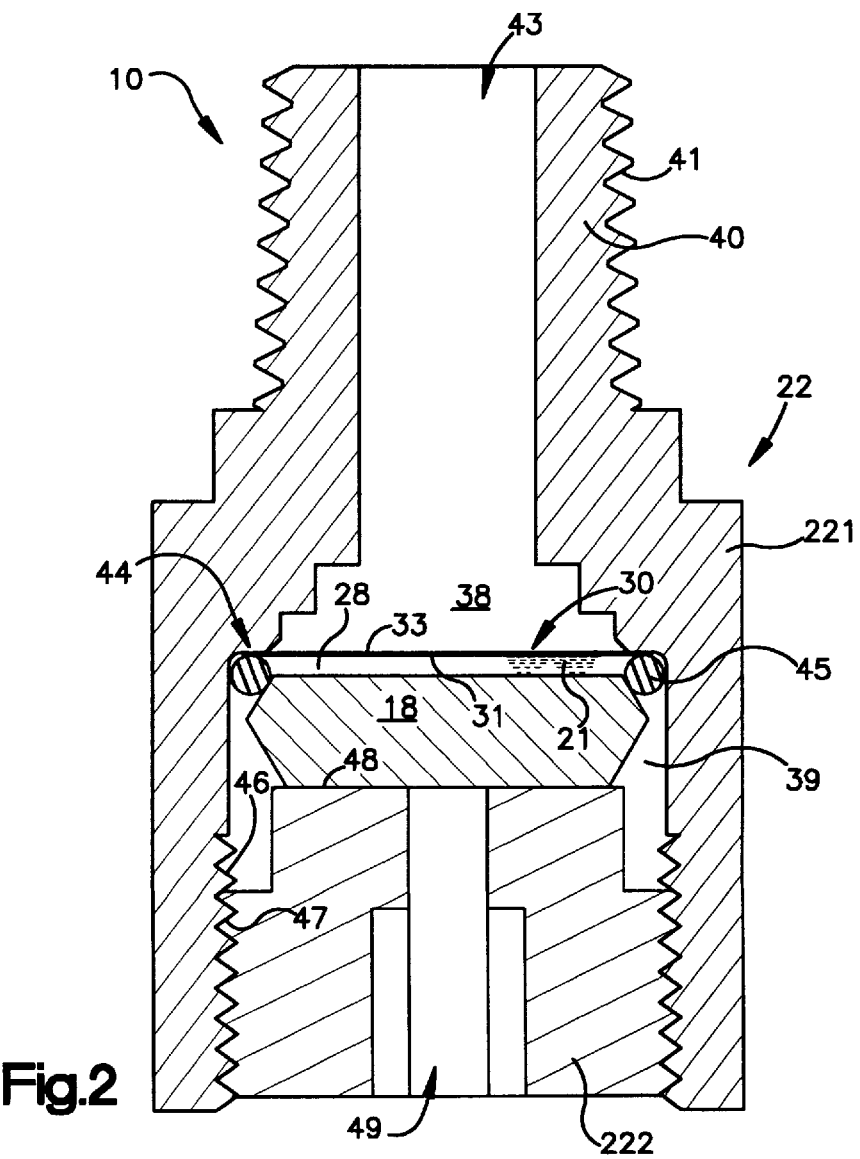
FIG. 2 is a cross-sectional view of an alternate embodiment of a packaged pressure sensor constructed in accordance with the present invention.

FIG. 2 illustrates an alternate embodiment of the media compatible packaged pressure sensor of the invention wherein the housing 22 includes a first housing piece 221 and a second housing piece 222. The first housing piece 221 includes a media conduit 40 which has an internal bore 43 which provides a fluid passageway which leads to a pressure port 38, and a somewhat larger main cavity 39. A flexible diaphragm 30, preferably made of a corrosive resistant polymeric material such as Teflon, is positioned within the internal cavity of first housing piece 221 adjacent to the pressure port 38, upon a ledge 44, so that one side 33 of the diaphragm faces the pressure port 38 and an opposite side 31 faces away from the pressure port 38. The diaphragm 30 is held in this position by an O-ring seal 45 which is held in place by an edge of pressure sensor die 18. The cavity 39 of the first housing piece 221 is provided with internal threads 46 which are engaged with external threads 47 on the second housing piece 222 which is advanced into cavity 39 so that an end 48 of second housing piece 222 contacts the pressure sensor die 18 (mounted within its own casing or encapsulation as known in the art), holding it against O-ring 45. In other words, the mechanical connection of the first housing piece 221 with the second housing piece 222 captures the pressure sensor die 18 in the main cavity 39. A pressure transfer cavity 28, which may be filled with a pressure transferring medium 21 such as oil, is thereby formed between the side 31 of the diaphragm and the opposing side of the pressure sensor die 18. The second housing piece 222 is also provided with an axial bore 49 to allow the pressure sensor to reference ambient pressure for gauge pressure measurements. Electrical leads (not shown) to the pressure sensor die 18 may pass through a wall of the first housing piece 221.

FIG. 3 illustrates another embodiment of the media compatible pressure sensor package of the invention. The housing 22 includes first and second pieces 221 and 222 which are threadably engaged, piece 221 having internal threads 223 and piece 222 having mating external threads 225. Pieces 221 and 222 each include a media port 40 and a pressure port 38. A pressure sensing device 18 is positioned within a main cavity 39 in the housing and held in place by a pair of O-rings 45 and a spacer ring 50 on each side of the pressure sensing device 18. With the pressure sensing device 18 positioned to generally equally divide the main cavity 39, two pressure transfer cavities 28 are formed, one on each side of the pressure sensing device 18. A diaphragm 30 is positioned and held between each pressure transfer pressure transfer cavity 28 and the adjacent pressure port 38 by an O-ring 45 and a spacer ring 50. The connection of the first housing piece 221 with the second housing piece 222 captures and positions the spacer rings 50 and the pressure sensing device 18 within the main cavity 39, and forms the opposed pressure transfer cavities 28.

A fluid fill port 32 extends through the wall of each housing piece 221 and 222. Corresponding fill ports 32 are also provided in the spacer rings 50 to allow the pressure transfer cavities 28 to be filled with oil or other pressure transferring medium, indicated generally at 21, after assembly of the housing. The fill ports 32 allow filling of pressure transferring media such as oil without introducing any excess pressure in either of the pressure transfer cavities. In this way the pressure in the opposing cavities 28 will be equal to atmosphere when the sensor package is sealed. This dual pressure port/transfer cavity package provides a differential sensor in which each media conduit/pressure port can be exposed to media for differential pressure sensing and measurement. If the package is designed so that the volume of fill fluid in each transfer cavity 28 is equal, then any pressure changes in the pressure transfer medium or fill fluid due to thermal expansion will be equal in both fluids and the effect will be cancelled out in the differential measurement. Electrical leads (not shown) to the pressure sensing device 18 can pass through the first or second housing pieces.

FIG. 4 illustrates another packaged pressure sensor of the invention wherein the housing 22 is made up of a first piece 221 and a second piece 222 which are bonded together at mating surfaces 27 to form a main cavity 39 in which a pressure sensing device 18 is centrally positioned and held in place. The attachment of the symmetrical housing pieces 221 and 222 captures, positions and holds the pressure sensing device 18 within the main cavity 39, and forms the opposed pressure transfer cavities 28. An opening at the mating surfaces 27 or through one of the housing pieces is provided for electrical leads (not shown) to the pressure sensing device. Pressure ports 38 are provided contiguous with the main cavity on either side of the pressure sensing device 18, and a diaphragm 30 isolates each pressure port from an adjacent pressure transfer cavity 28 on either side of the pressure sensing device 18. The diaphragms 30 are held in position within the housing by adhesive or welding or other suitable bonding of a peripheral region of the diaphragm to the interior of the cavity, or by an O-ring which can be positioned between the sensing device 18 and the interior of the housing. The media conduits 40 are in this example similarly laterally oriented relative to the housing 22, but of course can be alternatively arranged in different configurations relative to the housing. The housing 22 is preferably made of polysulfone, Teflon or PPS depending upon the type of media compatability required for any particular application. The diaphragm is preferably 3 mil thick polyethersulfone (PES) formed by stamping from film stock. Fill ports 32 extend from the exterior of the housing to each of the pressure transfer chambers 28 and can be filled with any suitable pressure transfer medium, indicated generally at 21, such as mineral oil by syringe or by vacuum backfill, and without introducing any excess pressure into the pressure transfer cavities. A recess 33 in the orifice allows a dot of glue or other sealant material to be applied to seal the fill port 32 and maintain a flush exterior surface to the housing. The rectangular shape and flat bottom of the housing facilitates part handling and is ideal for mounting on a circuit board, such as for example by mechanical fastening through mounting holes 29 provided in each housing piece. A 1/16 national pipe thread (NPT) standard fitting is provided with these packages but other common fitting styles, such as a nipple or barbed fitting, or other threaded sizes, can easily be substituted. The unilateral placement of the media ports 40 relative to the housing 22 is well suited for many different types of applications. The identical structure of the two housing pieces 221 and 222 reduces manufacturing costs of the sensor package. The pressure transfer cavities 28 are equally sized in order to calibrate out any pressure differentials induced by thermal expansion. The main cavity 39 of the housing can be configured to accommodate any type of pressure sensing device such as the Motorola MPX5050 pressure sensor or any type of bare pressure sensor die.

The invention thus provides simple, low cost polymeric pressure sensor packages which isolate a pressure sensing die from hostile environments and materials, and which produce accurate pressure readings without direct contact with the pressure sensing device. The formation of the package housings from molded material with excellent media compatibility maximizes possible applications and installations of pressure sensors. The formation of fastening means such as threaded couplings on the exterior of the housings facilitates installation and integration of sensors in different environments. The use of polymeric diaphragms which are stamped from thin sheet stock of media compatible material ensures uniformity in diaphragm thickness and accurate sensor readings. The fill ports in the sensor package housings allow pressure transfer fluid to be introduced to the package after attachment of the diaphragm, thereby eliminating the problem of introducing excess pressure or air into the pressure transfer cavities.

What is claimed is:

1. A media compatible pressure sensor package for receiving a pressure sensing device in operable contact with a media from which pressure is to be measured while isolating the pressure sensing device from direct physical contact with the media, the package comprising:
- a housing adapted for attachment to a base on which a pressure sensing device is mounted such that the housing and the base form a main cavity located between said base and said housing, said housing having a media port which extends from the main cavity;
- a diaphragm in the main cavity;
- a pressure port in the main cavity between the diaphragm and the media port; and
- a fill port extending to said main cavity.

2. The media compatible pressure sensor package of claim 1 wherein an exterior surface of the media port includes attachment means for securing the housing to a separate structure.

3. The media compatible pressure sensor package of claim 1 wherein the housing is made of a polymeric material.

4. The media compatible pressure sensor package of claim 1 wherein the diaphragm is made of a polymeric material.

5. The media compatible pressure sensor package of claim 1 wherein the diaphragm is secured by adhesive to the housing.

6. The media compatible pressure sensor package of claim 1 wherein the diaphragm is thermally welded to the housing.

7. The media compatible pressure sensor package of claim 1 wherein the pressure transfer cavity is fillable through the fill port with a pressure transferring medium.

8. The media compatible pressure sensor package of claim 7 wherein the pressure transfer cavity is filled with mineral oil.

9. The media compatible pressure sensor package of claim 7 wherein the pressure transfer cavity is filled with silicone oil.

10. The media compatible pressure sensor package of claim 7 wherein the housing is secured to the pressure sensing device base by an adhesive.

11. A pressure sensing device package for receiving a pressure sensing device in operative contact with a media from which pressure is to be measured while isolating the pressure sensing device from direct physical contact with the media, the device package comprising:
- first and second housing pieces which form a main cavity adapted to accept and receive a pressure sensing device, the first housing piece having a media conduit adapted for connection to a structure from which pressure is to be measured, a diaphragm in the main cavity, a pressure port between the media conduit and the diaphragm, and a pressure transfer cavity on a side of the diaphragm opposite to the pressure port, the first and second housing pieces adapted to receive said diaphragm and a pressure sensing device therebetween with a space between the pressure sensing device and the diaphragm which forms the pressure transfer cavity.

12. The pressure sensing device package of claim 11 further comprising a ledge in the first housing piece adapted to receive a portion of a diaphragm.

13. The pressure sensing device package of claim 11 wherein the first and second housing pieces are coupled together by threaded connection.

14. The pressure sensing device package of claim 11 wherein the second housing piece fits within the first housing piece.

15. The pressure sensing device package of claim 11 wherein the exterior of the media conduit is threaded.

16. The pressure sensing device package of claim 15 further comprising an O-ring between the pressure sensing device and the diaphragm.

17. The pressure sensing device package of claim 11 wherein the second housing piece includes a bore which when assembled with the first housing piece extends from the main cavity of the housing through the second housing piece.

18. A differential pressure sensing device package for housing and isolating a pressure sensing device in operative association with a media from which pressure is to be measured, the device package comprising:
- a housing having first and second pieces which are connectable together to form a main cavity within the housing adapted to receive a pressure sensing device, the first and second housing pieces each having:
  - a media conduit which extends from a pressure port and
  - an internal structure adapted to receive and position a diaphragm, and
- means within the main cavity for positioning a pressure sensing device between a diaphragm in the first housing piece and a diaphragm in the second housing piece, and providing a pressure transfer cavity between each diaphragm and a pressure sensing device in the main cavity.

19. The differential pressure sensing device package of claim 18 wherein the first and second housing pieces are mechanically coupled together.

20. The differential pressure sensing device package of claim 18 wherein an exterior surface of the media conduits are threaded.

21. The differential pressure sensing device package of claim 18 in combination with a pressure sensing device in the main cavity of the housing, wherein pressure transfer cavities of approximately equal volume are located on opposite sides of the pressure sensing device.

22. The differential pressure sensing device package of claim 18 in combination with a pressure sensing device held within the main cavity by O-rings and spacer rings between the pressure sensing device and the diaphragms.

23. The differential pressure sensing device package of claim 22 including two O-rings on each side of the pressure sensing device, one O-ring in contact with each diaphragm, and two O-rings in contact with the pressure sensing device, and a spacer ring between the two O-rings on each side of the pressure sensing device.

24. The differential pressure sensing device package of claim 18 further comprising at least one fill port in one of the housing pieces for introducing a pressure transfer medium into the pressure transfer cavities.

25. A media compatible pressure sensing device package having a housing adapted to encapsulate a pressure sensing device to isolate the device from direct contact with a media from which pressure is to be measured while holding the device in operative contact with media to be measured, the housing having a main cavity adapted receive and hold a pressure sensing device, first and second media conduits connected to the main cavity, pressure ports in the main cavity located generally at the media conduits, and one diaphragm between each pressure port and the main cavity to prevent passage of media from the pressure port to the main cavity.

26. The media compatible pressure sensing device package of claim 25 in combination with a pressure sensing device in the main cavity between the diaphragms, a pressure transfer cavity on each of opposed sides of the pressure sensing device between a diaphragm and the sensing device, and a pressure transferring medium in the pressure transfer cavities.

27. The media compatible pressure sensing device package of claim 25 wherein the housing is comprised of two pieces, each piece having one of the two media conduits, and each piece having a mating surface for attachment to the other housing piece.

28. The media compatible pressure sensing device package of claim 25 wherein the housing further comprises at least one fill port which extends through the housing into the main cavity.

29. The media compatible pressure sensing device package of claim 25 wherein the housing further comprises at least one mounting hole adapted to receive a fastener.

30. The media compatible pressure sensing device package of claim 25 further comprising attachment means on an exterior of the housing for attachment of the housing to a separate structure.

31. The media compatible pressure sensing device package of claim 26 wherein the diaphragms are bonded to the housing at the interface of the media conduits with the main cavity.

32. The media compatible pressure sensing device package of claim 26 wherein internal walls of the main cavity of the housing form a groove adapted to position the pressure sensing device in a position spaced from the diaphragms to form pressure transfer cavities of approximately equal volume on opposed sides of the pressure sensing device.

33. The media compatible pressure sensing device package of claim 26 further comprising two fill ports, each extending through a wall of the housing into one of the pressure transfer cavities between the diaphragm and the pressure sensing device.

34. The media compatible pressure sensing device package of claim 25 further comprising attachment means on the exterior of the first and second media conduits.

35. The media compatible pressure sensing device package of claim 25 wherein the media conduits are oriented generally orthogonal to a plane in which the diaphragms lie.

36. The media compatible pressure sensing device package of claim 25 wherein the housing is comprised of first and second pieces which are symmetrical.

37. A packaged pressure sensing device adapted for operative association with a media from which pressure is to be sensed or measured, the packaged pressure sensing device comprising:
 a housing having a media conduit which leads to a pressure port connected to a main cavity, the main cavity adapted to position and hold a pressure sensing device,
 a diaphragm bonded to an interior surface of the main cavity adjacent to the pressure port and spaced from the pressure sensing device to form a pressure transfer cavity within the main cavity between the diaphragm and the pressure sensing device,
 a fill port which extends through a wall of the housing through which a pressure transferring medium is introduced into the pressure transfer cavity, and means for occluding the fill port to seal the pressure transfer cavity.

38. The packaged pressure sensing device of claim 37 wherein an exterior of the housing includes integrally formed attachment means for attachment of the housing to a separate structure.

39. The packaged pressure sensing device of claim 37 wherein a cross-sectional area of the media conduit is less than a cross-sectional area of the pressure port.

40. The packaged pressure sensing device of claim 37 wherein the housing is comprised of two pieces.

41. The packaged pressure sensing device of claim 40 wherein internal walls of the main cavity of the housing are configured to position and hold the pressure sensing device by capturing the pressure sensing device between an internal wall of a first piece of the housing and an internal wall of a second piece of the housing.

42. The packaged pressure sensing device of claim 37 wherein the housing and diaphragm are made of a polymeric material with corrosive resistant properties whereby the housing can be placed in contact with a corrosive environment without damage to the housing, the diaphragm or a pressure sensing device within the housing.

43. The media compatible pressure sensor of claim 1 wherein said fill port extends from an exterior of said pressure sensor into said main cavity.

44. The media compatible pressure sensor of claim 1 further comprising a base shaped to sealingly receive said housing, said base having a pressure sensing device mounted thereon.

45. The media compatible pressure sensor of claim 44 wherein said base and said housing are threaded such that said housing may be threadingly coupled to said base.

46. The media compatible pressure sensor of claim 1 wherein said fill port is formed in said housing and extends from an exterior of the housing to the main cavity on a side of the diaphragm opposite the pressure port.

47. The media compatible pressure sensor package of claim 1 wherein said pressure port has an average cross sectional area that is greater than the average cross sectional area of said media port.

48. The media compatible pressure sensor package of claim 1 wherein said diaphragm is spaced away from the end surfaces of said main cavity.

49. The media compatible pressure sensor package of claim 1 further comprising: a base; and a pressure sensing device; said base being coupled to said housing and said pressure sensing device being coupled to said base, wherein a pressure transfer cavity is formed between said diaphragm and said base.

50. The media compatible pressure sensor package of claim 49 wherein said pressure sensing device is located in said pressure transfer cavity.

51. The pressure sensing device package of claim 11 further comprising a pressure sensing device positioned in said main cavity between said second housing piece and said diaphragm, said pressure sensing device package further including a pressure transfer medium in said pressure transfer cavity between said pressure sensing device and said diaphragm.

* * * * *